United States Patent
Chiu

(10) Patent No.: US 7,579,953 B2
(45) Date of Patent: Aug. 25, 2009

(54) DETECTING A SELF-JAMMER SIGNAL IN AN RFID SYSTEM

(75) Inventor: Scott Chiu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 315 days.

(21) Appl. No.: 11/756,326

(22) Filed: May 31, 2007

(65) Prior Publication Data

US 2008/0297321 A1    Dec. 4, 2008

(51) Int. Cl.
*G08B 13/14* (2006.01)

(52) U.S. Cl. .................. 340/572.2; 340/10.1; 375/376; 702/85

(58) Field of Classification Search ............ 340/572.2, 340/572.1, 10.1, 10.2, 10.4; 375/226, 371, 375/376; 702/69, 85, 86, 89
See application file for complete search history.

(56) References Cited

U.S. PATENT DOCUMENTS

| | | | | |
|---|---|---|---|---|
| 6,640,194 | B2* | 10/2003 | Little et al. | 375/376 |
| 7,035,365 | B2* | 4/2006 | Takatori et al. | 375/371 |
| 7,120,550 | B2* | 10/2006 | Diorio et al. | 702/85 |
| 7,154,979 | B2* | 12/2006 | Takatori et al. | 375/376 |
| 2003/0223504 | A1 | 12/2003 | Chen | |
| 2005/0015419 | A1 | 1/2005 | Pu | |
| 2005/0058279 | A1 | 3/2005 | Chiu | |
| 2005/0225433 | A1* | 10/2005 | Diorio et al. | 340/10.4 |
| 2007/0001856 | A1* | 1/2007 | Diorio et al. | 340/572.1 |
| 2007/0004355 | A1 | 1/2007 | Kipnis | |
| 2008/0252420 | A1* | 10/2008 | Scherabon | 340/10.1 |

OTHER PUBLICATIONS

U.S. Appl. No. 11/613,986, filed Dec. 20, 2006.
U.S. Appl. No. 11/241,067, filed Sep. 30, 2005.

* cited by examiner

*Primary Examiner*—John A Tweel, Jr.
(74) *Attorney, Agent, or Firm*—Joseph P. Curtin; Cool Patent, P.C.

(57) ABSTRACT

A radio frequency device capable of differentiating self-jammer signals.

12 Claims, 2 Drawing Sheets

DETECTING A SELF-JAMMER SIGNAL IN AN RFID SYSTEM

BACKGROUND

Radio-frequency identification (RFID) systems are capable of wireless data transmissions between an RFID reader and an RFID tag. In a typical RFID system employing passive RFID tags, an RFID reader communicates a signal to an RFID tag. The RFID tag returns the signal by backscattering the signal. The backscattered signal may couple with the signal sent from the RFID reader transmitter thereby generating a signal blocker called a self-jammer signal. A self-jammer signal may be difficult to detect and may interfere with the RFID reader's reception of the backscattered signal.

DETAILED DESCRIPTION

In the following detailed description, numerous specific details are set forth in order to provide a thorough understanding of claimed subject matter. However, it will be understood by those skilled in the art that claimed subject matter may be practiced without these specific details. In other instances, well-known methods, procedures, and components have not been described in detail so as not to obscure claimed subject matter.

Although the embodiments described herein refer to detection of self-jammer signals in an RFID system, such embodiments are meant for illustrative purposes and are not intended to limit the scope of the disclosure. The disclosed device and method is useful for detection of interfering signals in any of a variety of wireless systems, such as in mobile communications or networking in compliance with the Wi-Fi Alliance, for instance. In this disclosure, unwanted signals in a particular embodiment of a wireless system may be referred to as "signal blockers," "self-jammer signals," "adjacent channel blockers," "co-channel blockers" and/or "interfering signals." Such unwanted signals may cause a disturbance in the normal operation of the wireless system, resulting in errors and degrading system performance.

Figure 1:
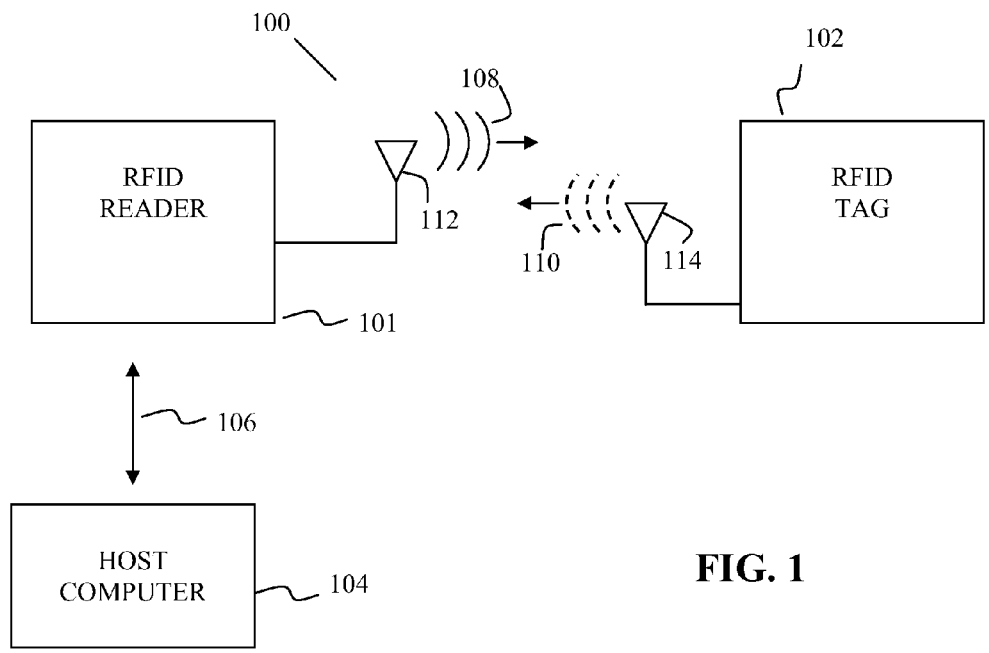
FIG. 1 is a schematic diagram representing an arrangement of an RFID system.

FIG. 1 is a schematic diagram illustrating a particular embodiment of a wireless system. In a particular embodiment, RFID system 100 may comprise RFID reader 101, RFID tag 102 and host computer 104. According to a particular embodiment, RFID reader 101 may transmit an interrogation signal 108 that may be received by RFID tag 102. According to a particular embodiment, RFID tag 102 may modulate and then reflect interrogation signal 108 sent by the RFID reader 101. RFID tag 102 may return interrogation signal 108 back to RFID reader 101 by a variety of methods, such as, for instance, by backscattering interrogation signal 108 to generate backscattered interrogation signal 110. In a particular embodiment, RFID reader 101 may then communicate data received from RFID tag 102 to host computer 104 for processing. However, this is merely an example of a configuration of a wireless system and claimed subject matter is not so limited.

RFID system 100 may operate in a variety of applications such as, for example, product tracking and animal identification. In a product tracking application, RFID tag 102 may be coupled to a product. The tagged product may then be tracked by RFID reader 101 without having to remove the product from packaging. In an animal identification application, RFID tag 102 may be implanted under the skin of an animal. RFID tag 102 may be read by RFID reader 101 in order to identify the animal bearing RFID tag 102. However, these are merely examples of applications for RFID systems and claimed subject matter is not limited in this regard.

In a particular embodiment, RFID tag 102 may be a passive tag. Passive RFID tag 102 may operate using power derived from interrogation signal 108 sent by RFID reader 101. However, this is merely an example of an RFID system employing a passive RFID tag and claimed subject matter is not so limited. For instance, RFID tags may also be active or semi-active and may require a power source in order to operate.

Referring still to FIG. 1, RFID reader 101 may comprise antenna 112. In a particular embodiment, antenna 112 may be capable of sending and/or receiving a signal to and/or from RFID tag 102. According to a particular embodiment, RFID tag 102 may comprise antenna 114. Antenna 114 may be capable of receiving interrogation signal 108 from RFID reader 101 and sending backscattered interrogation signal 110 to RFID reader 101. In a particular embodiment, RFID tag 102 may be capable of communicating data to RFID reader 101 via backscattered interrogation signal 110. However, this is merely an example of capabilities and configurations of RFID reader antennas and RFID tag antennas and claimed subject matter is not so limited. For instance, both RFID readers and RFID tags may have more than one antenna and/or may be capable of sending and/or receiving one or more signals.

According to a particular embodiment, RFID reader 101 may comprise a variety of transmitters (not shown), receivers (not shown), transponders (not shown) and/or transceivers (not shown) capable of transmitting and/or receiving radio frequency (RF) signals. Additionally, RFID tag 102 may comprise a variety of transmitters (not shown), receivers (not shown), transponders (not shown) and/or transceivers (not shown) capable of transmitting and/or receiving radio frequency (RF) signals. However, this is merely an example of various components that may comprise an RFID reader or RFID tag and claimed subject matter is not so limited.

In a particular application, RFID reader 101 may receive backscattered interrogation signal 110 from RFID tag 102 in the presence of other radio frequency emitting devices (not shown) such as, for instance, other RFID readers operating in the same radio frequency. In this example, RFID reader 101 may experience adjacent channel and co-channel interference (see description in FIG. 2) which may be caused by signals transmitting, for instance, from other RFID devices operating in the vicinity of RFID reader 101.

Additionally, in RFID system 100, interrogation signal 108 may be transmitting from RFID reader 101 at the same time that backscattered interrogation signal 110 is transmitting from RFID tag 102. These two signals may couple, generating an interfering signal called a "self-jammer". A self-jammer may be an amplitude and phase shifted version of the local oscillator generated signal. In a particular embodiment, coupling of interrogation signal 108 and backscattered interrogation signal 110 may occur as a result of impedance mismatching in RFID system 100, for instance.

Figure 2:
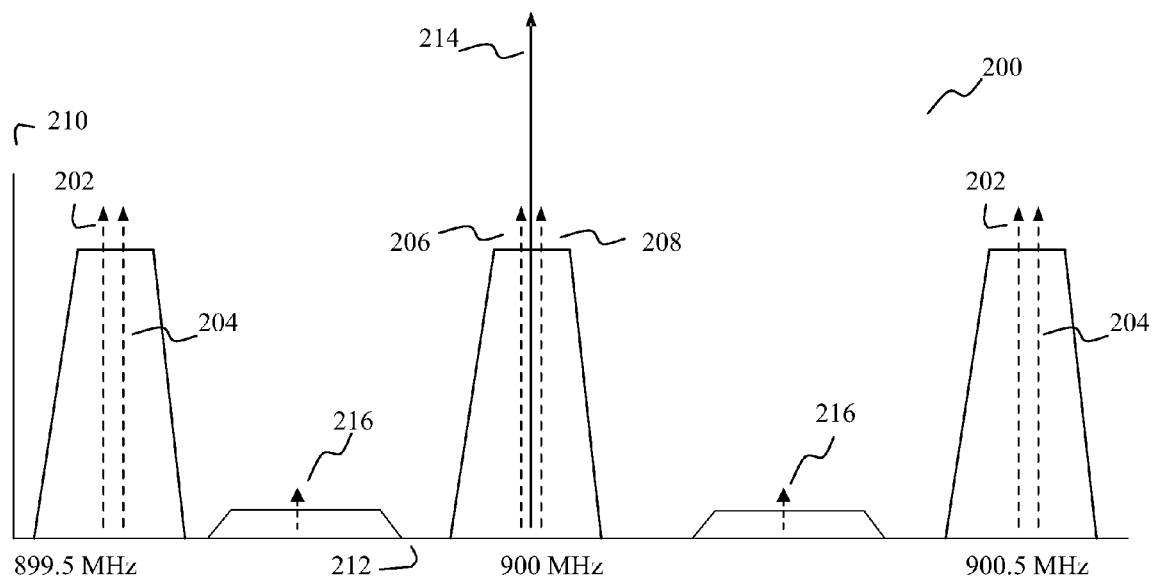
FIG. 2 is a graphical representation of signals in an embodiment of an RFID system.

FIG. 2 is a graphical representation of signals in an embodiment of an RFID system 200. On the graph, y-axis 210 represents amplitude, x-axis 212 represents frequency and relative signal strength is indicated by the height of the arrows on the graph. As discussed above, in a particular embodiment, an RFID reader may be operating in an environment where there are other RFID readers present and that may be operating in the same frequency. In such an environment, multiple interfering signals may be present. The interfering signals may be continuous wave or modulated signals and may disrupt an RFID reader's ability to interpret information sent by an RFID tag.

In this system, relatively weak tag signals 216 may be degraded in the presence of interfering signals, such as, for instance, self-jammer 214, continuous wave adjacent channel blockers 202, modulated adjacent channel blockers 204, continuous wave co-channel blockers 206 and modulated co-channel blocker 208. In a particular embodiment, self-jammer 214 may share a frequency with co-channel blockers 206 and 208 making differentiation of co-channel blockers 206 and 208 from self-jammer 214 difficult.

According to a particular embodiment, an RFID reader may be capable of transmitting a signal having 30 dBm of transmitted power and may have 15 dB of transmit-to-receive isolation. In this example, self-jammer signal 214 may have a power level of 15 dBm. Alternatively, a worst case antenna reflection may generate an additional 15 dBm of reflected power that may add to a coupled carrier wave and may generate self-jammer signal 214 having 18 dBm of transmitting power.

Figure 3:
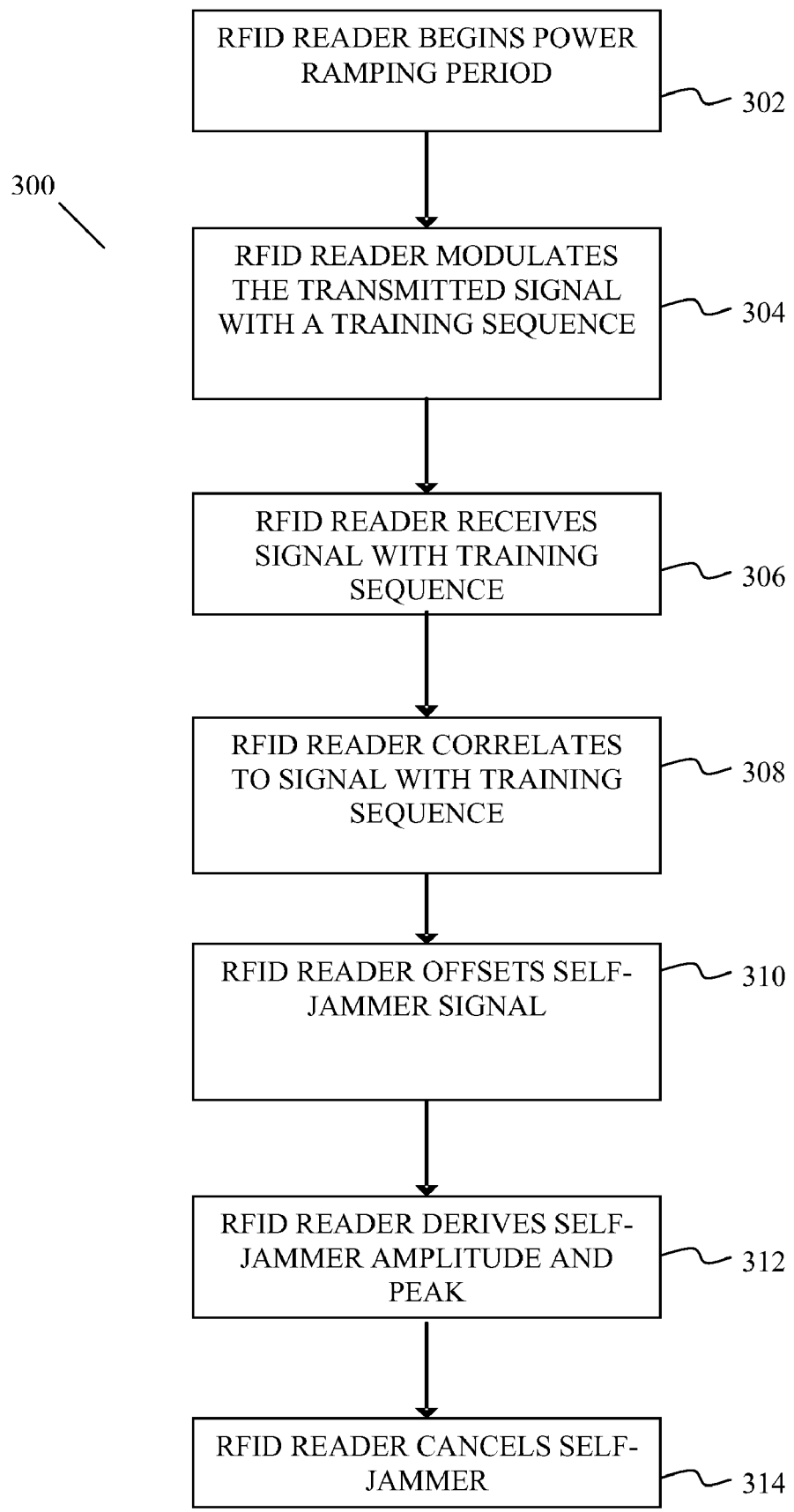
FIG. 3 is a flowchart illustrating a method for use in an RFID system in accordance with an embodiment of the present invention.

A detection mechanism for residual self-jammer signal 214 may enable cancellation of self-jammer signal 214. FIG. 3 illustrates a process 300, by which RFID reader 101 may detect self-jammer signal 214 according to a particular embodiment.

In FIG. 3, at block 302, RFID reader 101 begins a power ramping sequence. In a particular embodiment, an RFID reader power ramping sequence may occur after powering RFID reader on and hopping to a new channel.

According to a particular embodiment, at block 304 RFID reader 101 may modulate a transmitted signal with a training sequence. RFID reader 101 may transmit a baseband signal modulated with a training sequence.

According to a particular embodiment, at block 306, RFID reader 101 may receive a modulated signal during a power ramping period due to antenna reflection and transmitter to receiver leakage At block 308, RFID reader 101 may correlate the received signal with a known training sequence. In a particular embodiment, RFID reader 101 receiver baseband signal processor may be used to correlate to the training sequence. A training sequence may be recovered and processed by any of a variety of correlation techniques.

In a particular embodiment, at block 310, a training sequence, as described above, may enable RFID reader 101 to offset or place self-jammer 214 spectrum energy in-between co-channel blockers and adjacent channel blockers. According to a particular embodiment, a training sequence may also carry a unique identifier. Such an identifier may enable RFID reader 101 to identify a self-jammer signal at offset.

In a particular embodiment, at block 312 an RFID reader may derive a self-jammer signal power. According to a particular embodiment, a received signal comprising a training sequence may be utilized to determine any of a variety of self-jammer signal characteristics. In a particular embodiment, an RFID reader 101 may identify a self-jammer signal and derive characteristics of a self-jammer signal based on a correlation peak of a received signal and training sequence, as described above.

Finally, at block 314, RFID reader 101 may cancel self-jammer signal using a replica of the transmitted signal by varying its phase and amplitude. However, this is merely an example of a particular embodiment of a process for differentiating a self-jammer signal from other interfering signals using a training sequence and claimed subject matter is not so limited. For instance, in another particular embodiment, a process for differentiating a self-jammer signal may take place after a power ramping period, for example.

While certain features of claimed subject matter have been illustrated as described herein, many modifications, substitutions, changes and equivalents will now occur to those skilled in the art. It is, therefore, to be understood that the appended claims are intended to cover all such embodiments and changes as fall within the true spirit of claimed subject matter.

What is claimed is:

1. A method for identifying a self-jammer signal in a radio frequency identification (RFID) system comprising:
   modulating a radio frequency (RF) signal with a training sequence;
   transmitting the modulated RF signal;
   receiving the modulated RF signal;
   correlating the training sequence to a self-jammer signal;
   offsetting the self-jammer signal;
   determining one or more characteristics of the self-jammer signal; and
   canceling the self-jammer signal.

2. The method of claim 1, wherein the training sequence comprises identifying data.

3. The method of claim 1, wherein the training sequence comprises instructions for offsetting the self-jammer signal.

4. The method of claim 1, wherein determining characteristics of the self-jammer signal comprises determining a peak and amplitude of the self-jammer signal based at least in part on a correlation peak of the modulated RF signal.

5. The method of claim 1, wherein determining characteristics of the self-jammer signal occurs during a power ramping period of an RF device.

6. The method of claim 1, wherein canceling the self-jammer signal comprises using a phase and an amplitude of the self-jammer.

7. An apparatus capable of determining a self-jammer signal in a RFID system comprising:
   a modulator capable of modulating a baseband RF signal with a training sequence;
   a transmitter capable of transmitting the modulated RF signal;
   a receiver capable of receiving the modulated RF signal;
   a correlator capable of correlating the training sequence to a self-jammer signal;
   a modulator capable of offsetting the self-jammer signal;
   a circuit capable of determining characteristics of self-jammer signal; and
   a circuit capable of canceling the self-jammer signal.

8. The apparatus of claim 7, wherein the training sequence comprises identifying data.

9. The apparatus of claim 7, wherein the training sequence comprises instructions for offsetting the self-jammer signal.

10. The apparatus of claim 7, wherein the circuit capable of determining characteristics of the self-jammer signal is further capable of determining a peak and an amplitude of the self-jammer signal based at least in part on a correlation peak of the modulated RF signal.

11. The apparatus of claim 7, wherein the circuit capable of canceling the self-jammer signal is further capable of using a phase and an amplitude of the self-jammer in the cancellation process.

12. The apparatus of claim 7, wherein the receiver comprises an antenna.

* * * * *